United States Patent
Eckert

(10) Patent No.: US 6,234,583 B1
(45) Date of Patent: May 22, 2001

(54) PROCESS FOR REGULATING A PREDETERMINED, CHANGEABLE BRAKE PRESSURE IN THE WHEEL BRAKES OF A BRAKING SYSTEM

(75) Inventor: Alfred Eckert, Bodenheim (DE)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 0 days.

(21) Appl. No.: 08/973,235

(22) PCT Filed: May 9, 1996

(86) PCT No.: PCT/EP96/01951

§ 371 Date: Feb. 9, 1998

§ 102(e) Date: Feb. 9, 1998

(87) PCT Pub. No.: WO96/41736

PCT Pub. Date: Dec. 27, 1996

(30) Foreign Application Priority Data

Jun. 9, 1995 (DE) .............................................. 195 21 086

(51) Int. Cl.⁷ ................................ B60T 8/00; B60K 28/16
(52) U.S. Cl. .................................. 303/3; 303/15; 303/140; 701/78
(58) Field of Search .................................. 701/70, 72, 83, 701/78; 303/3, 15, 140, 146, DIG. 1, DIG. 2; 364/426.016, 426.018, 426.028; 180/197

(56) References Cited

U.S. PATENT DOCUMENTS 5,711,025 * 1/1998 Eckert et al. .......................... 701/83
5,732,379 * 3/1998 Eckert et al. .......................... 701/83
5,735,584 * 4/1998 Eckert et al. ........................ 303/140
5,862,503 * 1/1999 Eckert et al. .......................... 701/78

FOREIGN PATENT DOCUMENTS 43 12 404   10/1994  (DE) .
0 381 957    8/1990  (EP) .
2 695 367    3/1994  (FR) .
92/05986     4/1992  (WO) .

* cited by examiner

Primary Examiner—Chris Schwartz
(74) Attorney, Agent, or Firm—Rader, Fishman & Grauer PLLC

(57) ABSTRACT

The present invention relates to a method of adjusting a predetermined, variable braking pressure in the wheel brakes of a brake system, in which the input quantities which determine the braking pressure in the individual wheel brakes are ascertained in a control and data-processing system, and actuation times of hydraulic valves, setting signals of actuators, etc., are established. These input quantities preferably reproduce the pressure, the pressure fluid volume, or the wheel slip. The input quantities and their time derivatives are weighted for the individual wheels and added in a pressure controller. The sum is further processed in a non-linear transmission element. In consideration of the valve or actuator characteristic, a pressure fluid volume flow is ascertained from which actuation times or setting signals for the hydraulic valves or actuators, which control the pressure decrease and increase in the individual wheel brakes, are established in a valve actuation logic taking account of the valve or actuator characteristic.

12 Claims, 2 Drawing Sheets

PROCESS FOR REGULATING A PREDETERMINED, CHANGEABLE BRAKE PRESSURE IN THE WHEEL BRAKES OF A BRAKING SYSTEM

FIELD OF THE INVENTION

The present invention relates to a method of adjusting a predetermined, variable braking pressure in the wheel brakes of a brake system, wherein input quantities which determine the braking pressure in the individual wheel brakes are ascertained in a control and data-processing system, and actuation times, or control variables of hydraulic valves, actuators, or like elements, by which the braking pressure is controlled, are established.

BACKGROUND OF THE INVENTION

In vehicle control systems of most various types which are based on brake management or brake actuation, there is a demand for a method of continuously adjusting a predetermined, variable braking pressure or braking pressure variation in the individual wheel brakes. This control method should be adept, easy to realize and adaptable to different conditions and different control modes. Vehicle control systems of the type at issue include, for example, traction slip and driving stability control systems, systems for automatic control of the distance between moving automotive vehicles (AICC—Autonomous Intelligent Cruise Control), purely electrical vehicle brake systems (brake-by-wire), etc. The object of the present invention is to provide a pressure control method of this type.

SUMMARY OF THE INVENTION

It has been found that this object can be achieved by the method described in the attached claim 1. Some embodiments are described in the subclaims. The adjustment of the braking pressure in a method for driving stability control is a particularly advantageous embodiment of the present invention.

In a method of the type described in the preamble of claim 1, the special features of the present invention include that the input quantity which determines the braking pressure and is calculated, for example, in a yawing torque controller, and the time derivatives of the input quantity are weighted and added in a pressure controller for each individual wheel. The sum which thereby develops is sent to a non-linear transmission element, and a pressure fluid volume flow is determined from this sum by way of the transmission element in dependence on the characteristics of the hydraulic valves used or the actuators used. In a valve actuation logic unit or valve switching times logic, the actuation times or control times of the hydraulic valves controlling the pressure increase and the pressure decrease or actuators are established as a function of the ascertained pressure fluid volume flow and the valve or actuator characteristic.

In particular quantities representative of the pressure, the pressure fluid volume or the wheel slip are appropriate as input quantities of the pressure controller.

According to the present invention, a two-position or three-position switch, if necessary, switches with a change-over hysteresis, is provided as a non-linear transmission element depending on the case of application and the requirements.

The control method of the present invention provides a simple, robust and stable control structure. The control method can be achieved by circuit hardware, or by software, or by way of programmed circuit technology.

The control method is equally appropriate for use in hydraulic switch valves, proportional valves, hydraulic actuators, and like elements, as components for braking pressure control.

Further features, advantages and possible applications of the present invention can be seen in the following description of an embodiment by way of the attached function charts.

DETAILED DESCRIPTION OF THE DRAWINGS

Figure 1:
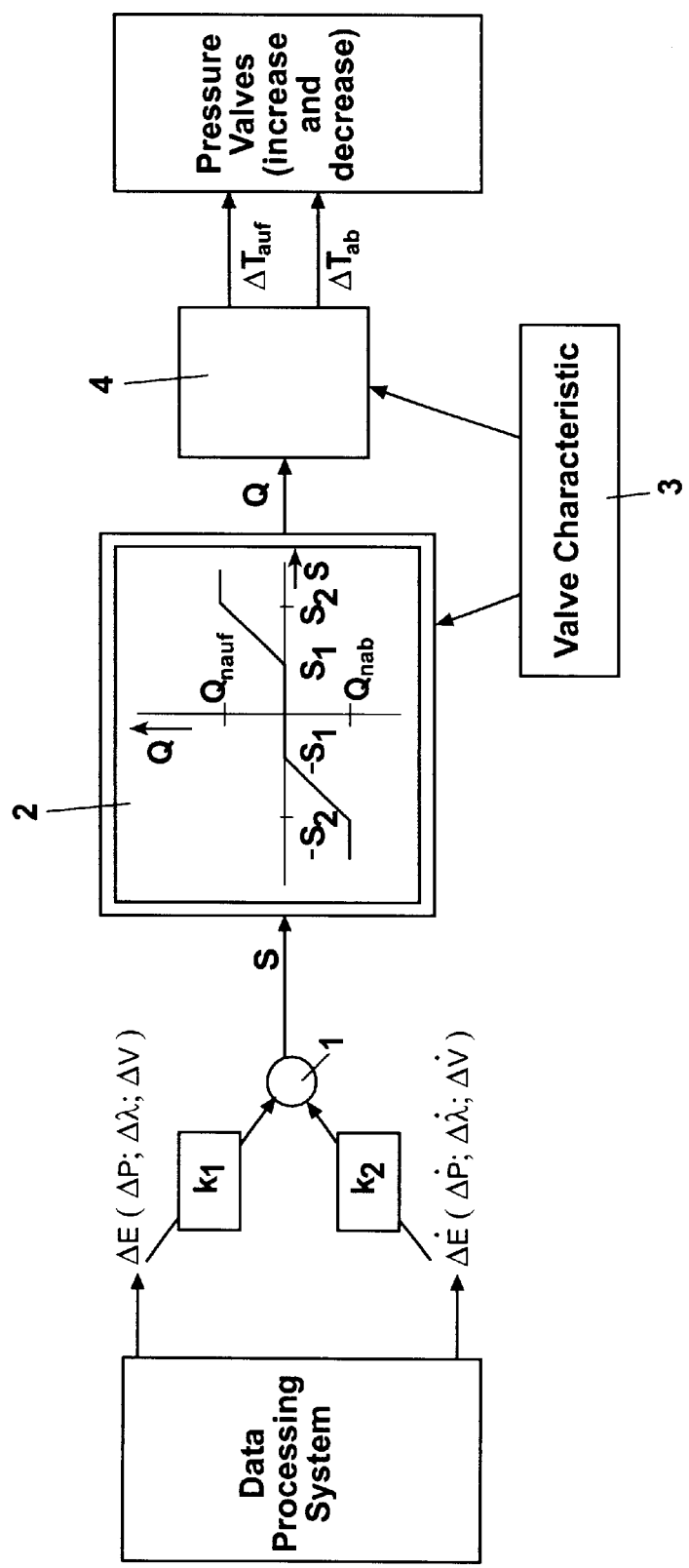
FIG. 1 is a view of the structure of a controller for adjusting a predetermined, variable braking pressure according to an embodiment of the present invention.

FIG. 1 shows the principal design of a controller for implementing the method of the present invention. An absolute quantity $\Delta E$, which was developed in a control or data-processing system (not shown) and contains the information about the determined pressure in a wheel brake is an input quantity of the pressure controller shown. The second input quantity is the time derivative $\Delta \dot{E}$. These input quantities $\Delta E$, $\Delta \dot{E}$ can comprise especially the predetermined pressure, the pressure fluid volume, or the wheel slip, or the time derivatives of these quantities. Of course, it is also possible to produce the time derivative by means of the controller.

The input signals $\Delta E$, $\Delta \dot{E}$ are weighted by a predetermined or calculated factor $k_1$ or $k_2$ and added in an adder 1. The sum S is further processed in a non-linear transmission element 2, by way of which (in consideration of a valve characteristic 3 which is comprised in a valve pattern in the present embodiment) a pressure fluid volume flow Q is determined which corresponds to the input signal S of the transmission element 2. The output value of the non-linear transmission element 2 represents the pressure fluid volume flow Q which is required by the control system, and is responsive to the input quantities $\Delta E$, $\Delta \dot{E}$ and takes the valve characteristic into account. Subsequently, the valve switching times $\Delta T$, $\Delta T_{auf}$, $\Delta T_{ab}$ are calculated from the input value Q in a distribution logic 4 or valve actuation logic. The braking pressure required is then adjusted directly in the associated wheel brake by these valve actuation signals or setting signals (or actuator setting signals).

A three-position switch with a proportional band is provided as a non-linear transmission element 2 in the present embodiment of the invention. This is shown in the diagram in the interior of block 2. The curve variation illustrates the valve characteristic. A dead zone ranges between $S_1$ and $-S_1$. $Q_{n\ auf}$ und $Q_{n\ ab}$ are due to the maximum opening cross-sections or volume flows. The proportional bands lie between $S_1$ and $S_2$ or $-S_1$, $-S_2$.

In the valve actuation logic 4, the opening times $\Delta T$ or $\Delta T_{auf}$, $\Delta T_{ab}$ of the valves determining the pressure increase and pressure decrease are produced according to the relation $$\Delta T_{auf/ab} = \frac{Q}{Q_{n\,auf/ab}} * T_o$$

and $T_o$ refers to the time basis of the control system or the scanning time of the controller. This relation applies to digital valves. Proportional valves, or plunger systems, and other actuators may also be used. The logic 4 would establish the setting signals or the actuating current for the corresponding hydraulic components or for the actuators in this case.

The valve pattern 3 which, among others, influences the parameters and limit values of the transmission element 2 and the logic 4 can be extended to such effect that previous valve activities, valve positions, etc. (for example, a valve not yet closed, energy storage in the valve spring or in the magnetic field, etc.) are also taken into account for the individual calculating operations.

Figure 2:
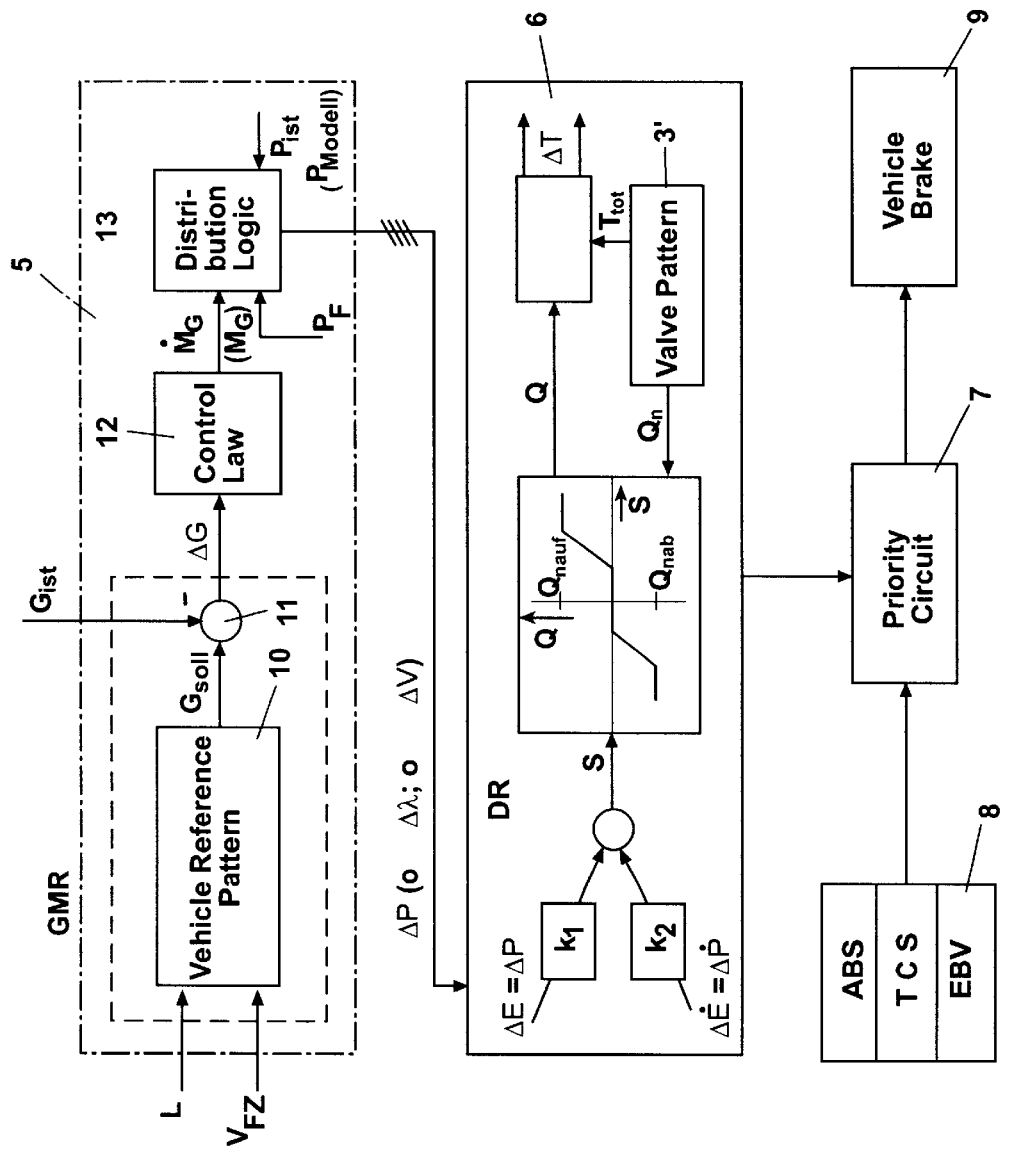
FIG. 2 is a view, similar to FIG. 1, of the integration of the pressure controller of FIG. 1 in a driving stability control system.

FIG. 2 shows the integration of the pressure controller of FIG. 1 in the structure of a very simplified view of a system for the control of driving stability of an automotive vehicle.

The driving stability control system in FIG. 2 generally includes a yawing torque controller (GMR) 5, the pressure controller 6 described in FIG. 1, a priority circuit 7, a controller part 8 comprising other control components of the driving stability control system, and finally a block 9 representing the automotive vehicle and mainly the automotive vehicle brakes. All these parts represent in a simplified fashion the controller structure and show the data flow, the entire control circuit, the input signals utilized, etc. A controller of this type is preferably achieved by way of programmed circuits (microcomputers, microcontrollers, etc.) and a brake system with hydraulic valves or actuators which is able to build up the calculated braking pressure in the individual wheel brakes and to adjust the desired braking pressure variation both during brake pedal application and when the brake is not applied. For traction slip control and driving stability control, as is known, intervention in the control of the drive motor is also necessary in determined phases.

The components required for yawing torque control are comprised in block 5. In the present case, a so-called vehicle reference pattern 10, predefined by calculating programs and algorithms, is furnished in a known fashion with data about the steering angle L and the vehicle speed $V_{FZ}$ or vehicle reference speed as input quantities. On the basis of the vehicle reference pattern 10, a nominal value of the yawing angle speed $G_{soll}$ is calculated and related to the measured actual value of the yawing angle speed $G_{ist}$ in a comparator 11. The differential value $\Delta G$ between the nominal and the actual yawing angle speeds is further processed in a circuit termed as control law 12 which generally comprises a comprehensive program to determine an additional yawing torque $M_G$ or a torque variation $\dot{M}_G$. Braking pressure control quantities for each individual wheel or for the individual wheel brakes are then derived from the additional yawing torque, the torque variation and an input quantity $P_F$ responsive to brake pedal application. The braking pressure which actually prevails in the individual wheel brakes as the result of a measurement operation ($P_{ist}$) or from a corresponding pressure pattern ($P_{Modell}$) is also taken into account by a distribution logic 13.

In the embodiment of FIG. 2, pressure difference signals $\Delta P$, $\Delta \dot{P}$ are available at the output of the distribution logic 13 and, thus, of the yawing torque controller 5 and are fruther processed in the pressure controller 6 as input quantities $\Delta E$, $\Delta \dot{E}$ (see FIG. 1). Instead of the absolute pressure quantities $\Delta P$, $\Delta \dot{P}$, as has been explained hereinabove, other quantities representative of the pressure fluid volume $\Delta V$ or the wheel slip $\Delta 8$ can be processed. The desired data about the required braking pressure or braking pressure variation in the individual wheel brakes are also included in these quantities.

The pressure controller 6 of FIG. 2 is identical to the pressure controller of FIG. 1. The special feature is that the pressure quantities $\Delta P$, $\Delta \dot{P}$ are processed as input quantities $\Delta E$, $\Delta \dot{E}$ according to FIG. 2. Data about the valve behavior, i.e. the valve characteristic or actuator characteristic, data about the limit values $Q_n$ ($Q_{n\,auf}$, $Q_{n\,ab}$), about the dead times $T_{tot}$ are also taken from a valve pattern 3' in the embodiment of FIG. 2. The parameters $Q_{n\,auf/ab}$ stored in the valve pattern 3', the dead times and other influencing variables for the behavior of the valves can be modified, if necessary, as a function of previous valve activities and valve actuation control actions in order to increase the precision of defining the actual valve behavior and the pressure fluid volume flow achieved.

The output signals of the pressure controller 6, which can be valve or actuator setting signals, are compared in the priority circuit 7 with corresponding valve or actuator actuating signals which are produced in other parts of the controller, for example, in an anti-lock system (ABS), a traction slip control system (TCS) or in an electronic brake force distributor (EBV). For safety reasons or stability reasons, certain valve requirements or valve actuating signals have priority as the situation may be. Appropriately, the valve actuating signals produced in the various controller parts are coordinated in the priority circuit 7. In some situations, the objective of priority is to maintain driving stability, in other situations to achieve a short stopping distance. A great number of linkings of the signals originating from the individual controllers is possible.

Finally, the actual actuating signals prevail at the output of the priority circuit 7, on command of which the hydraulic valves or other actuators are actuated to influence the vehicle behavior in the desired manner and to thereby close the control circuit.

What is claimed is:

1. A method of adjusting a predetermined, variable braking pressure in wheel brakes of a brake system, including the steps of:

establishing input quantities for determining a braking pressure in the individual wheel brakes in a control and data-processing system and control variables of elements by which the braking pressure is controlled; input quantities which determine a braking pressure in the individual wheel brakes are ascertained in a control and data-processing system, and control variables of elements, by which the braking pressure is controlled, are established;

weighting the input quantity which determines the braking pressure and the time derivative of said input quantity for each individual wheel brake, and adding said input quantity and the time derivative of said input quantity for each individual wheel brake in a pressure controller to provide a sum; the input quantity which determines the braking pressure and the time derivative of this input quantity is weighted for each individual wheel brake and the weighted quantities are added in a pressure controller;

communicating said sum to a non-linear transmission element and determining a pressure fluid volume flow from said sum by way of said non-linear transmission element as a function of a valve characteristic; and the sum is sent to a non-linear transmission element, wherein a pressure fluid volume flow is determined from the sum by way of the non-linear transmission element in dependence on the characteristic of the elements; and establishing activation times of the elements controlling the pressure increase and decrease as a function of the determined pressure fluid volume flow and the valve characteristic; establishing actuation times of the elements controlling the pressure increase and the pressure decrease is established as a function of the determined pressure fluid volume flow and the element characteristic.

2. The method as claimed in claim 1, wherein the braking pressure and the time derivative of the braking pressure are determined and sent to the pressure controller as input quantities which define the braking pressure.

3. The method as claimed in claim 1, wherein a pressure fluid volume and the time derivative of the pressure fluid volume is determined and sent to the pressure controller as input quantities which define the braking pressure.

4. The method as claimed in claim 1, wherein a wheel slip and the time derivative of the wheel slip is determined and sent to the pressure controller as input quantities which define the braking pressure.

5. The method as claimed in claim 1, wherein a switch selected from the group consisting of a two-position switch and three-position switch is used as a non-linear transmission element.

6. The method as claimed in claim 1, wherein a three-position switch including a proportional band is used as a non-linear transmission element.

7. The method as claimed in claim 1, wherein a switch including a change-over hysteresis is used as a non-linear transmission element.

8. The method as claimed in claim 1, including a distribution logic that controls the valve switching times of the opening and closing of the hydraulic valves controlling the braking pressure, wherein said valve switching times are established according to the relation $$\Delta T_{auf/ab} = \frac{Q}{Q_{n\ auf/ab}} * T_o$$

wherein Q is the required pressure fluid volume flow determined by the transmission element; $Q_n$ is the maximum possible volume flow; and $T_o$ is the time basis of the control system.

9. The method as claimed in claim 1, wherein the characteristic behavior of the valves is reproduced by a valve characteristic pattern which provides the valve characteristic values for the non-linear transmission element and for a distribution logic.

10. A method for controlling the driving stability of a vehicle, including the steps of:

determining input quantities responsive to a steering angle and a vehicle speed using a vehicle reference pattern established by operands and algorithms;

converting the input quantities into a nominal yaw angle value;

calculating the difference between the nominal yaw angle value and an actual yaw angle value and evaluating said difference according to a predetermined control algorithm functioning as a control law;

generating control quantities;

calculating torque quantities from said control quantities;

processing said toque quantities to effectuate an adjustment signal, wherein said adjustment signal is selected from the group consisting of (i) adjusting the amount of pressure to be adjusted in individual wheel brakes and (ii) determining a corresponding quantity which causes an additional yawing torque that makes a measured yawing value approach the nominal yawing angle value, sending said adjustment signal to a distribution logic, wherein a pedal force exerted by a vehicle driver and the actual braking pressure or an approximated value thereof are considered, emitting input quantities to determine the braking pressure in the individual wheel brakes, and sending the input quantities and the time derivative of the input quantities to a pressure controller.

11. The method as claimed in claim 10, wherein the pressure controller weights each input quantity determining the braking pressure and the time derivative of each input quantity; adds each input quantity and the time derivative of each; and sends the sum to a non-linear transmission element wherein the pressure fluid volume flow is determined, and wherein in a valve actuation times of pressure-increase valves in a pressure-increase path and pressure-decrease valves in a pressure-decrease path are established as a function of the determined volume flow and the respective maximum values of pressure fluid passage in the pressure-increase path and the pressure-decrease path.

12. The method as claimed in claim 10, wherein the pressure controller generates output signals and such output signals are compared in a priority circuit with signals produced by other part systems of the system and are evaluated in consideration of a predetermined priority.

* * * * *

UNITED STATES PATENT AND TRADEMARK OFFICE
CERTIFICATE OF CORRECTION

PATENT NO.    : 6,234,583 B1
DATED         : May 22, 2001
INVENTOR(S)   : Alfred Eckert It is certified that error appears in the above-identified patent and that said Letters Patent is hereby corrected as shown below:

<u>Column 5,</u>
Line 9, change "characteristic;" to -- characteristic, --

<u>Column 6,</u>
Line 17, change "said toque quantities" to -- said torque quantities --

Signed and Sealed this

Twenty-eighth Day of May, 2002

Attest:

*Attesting Officer*

JAMES E. ROGAN
*Director of the United States Patent and Trademark Office*